United States Patent

[11] 3,573,733

[72] Inventor Troy L. Pegram
Wabash, Ind.
[21] Appl. No. 786,346
[22] Filed Dec. 23, 1968
[45] Patented Apr. 6, 1971
[73] Assignee Honeywell Inc.
Minneapolis, Minn.

[54] INFORMATION RETRIEVAL SCANNING SYSTEM
2 Claims, 1 Drawing Fig.

[52] U.S. Cl. .................................................... 340/163R
[51] Int. Cl. .................................................... H04g 9/00
[50] Field of Search ........................................ 340/413, 163, 147, 150, 183, 213, 203

[56] References Cited

UNITED STATES PATENTS 3,428,947 2/1969 Macurdy ...................... 340/147

*Primary Examiner*—Ralph D. Blakeslee
*Attorneys*—Lamont B. Koontz, Francis A. Sirr and Clyde C. Blinn

ABSTRACT: An information retrieval scanning system for indicating a change in the position of each of a plurality of remote station switches at a central station wherein upon a change in the position of any one of the remote station switches, a scan command signal from that particular station is provided. Scanning apparatus in the central station seeks out the station providing the scan command signal to energize apparatus for responding to the position of the switch at the central station and cancelling the scan command signal of that station.

PATENTED APR 6 1971 3,573,733
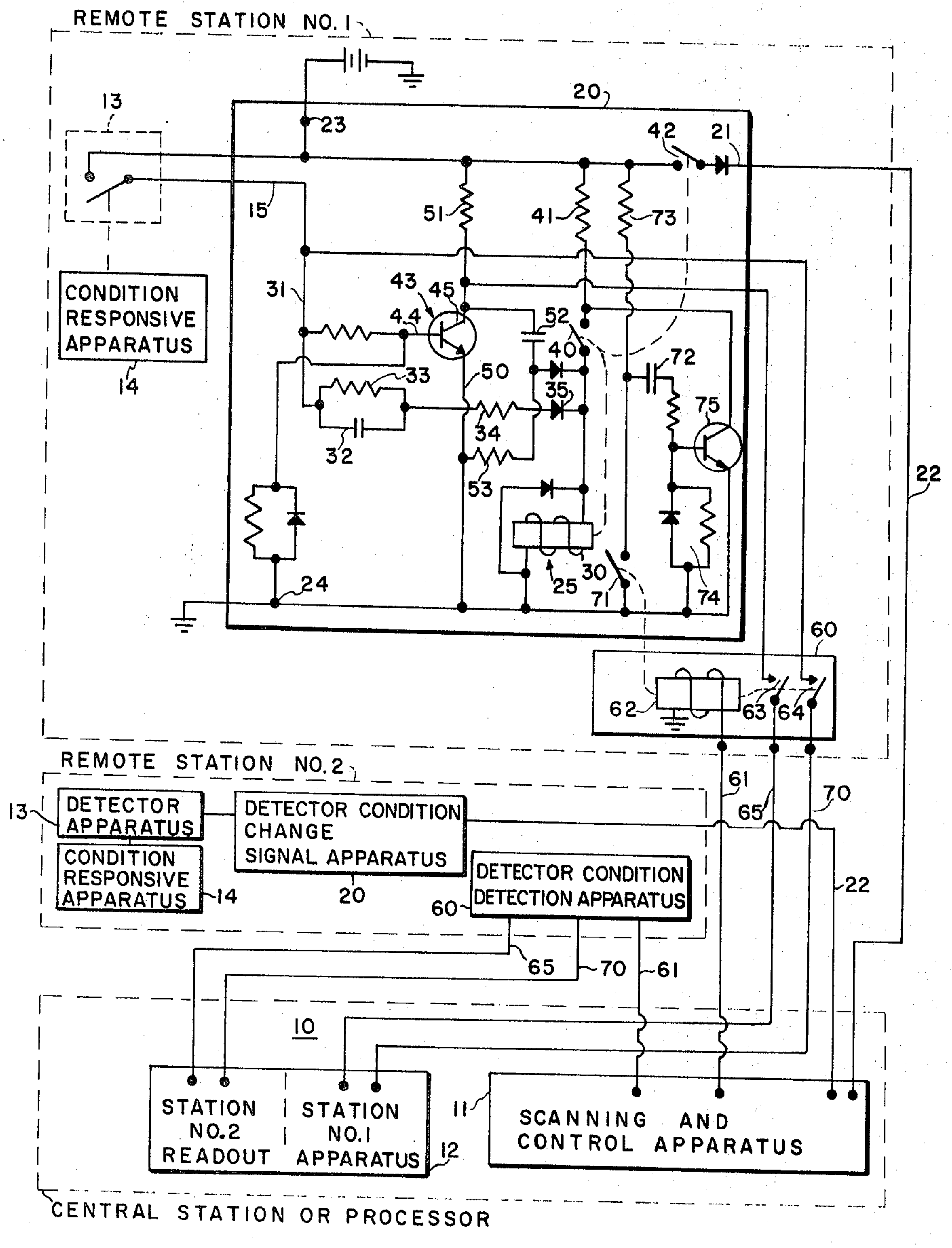
INVENTOR.
TROY L. PEGRAM
BY Clyde C. Blinn
ATTORNEY.

INFORMATION RETRIEVAL SCANNING SYSTEM

BACKGROUND OF THE INVENTION

In information retrieval systems wherein a change in the condition of a plurality of remote station detectors or switches is to be indicated at a central station, scanning systems have been commonly used. In a copending Robert L. Harrison et al. patent application, Ser. No. 691,863, filed Dec. 19, 1967, now abandoned, for An Information Retrieval Scanning System, an improved information retrieval scanning system is disclosed. Each detector at the remote station has a means for providing an output signal upon a change in condition of the detector. The scanning apparatus in the central station seeks out the remote station which has an output signal indicating a change in the condition of the detector, and readout of the present condition of the detector is accomplished from the central station. After the readout has been accomplished, the output signal is cancelled. With such a system, the condition of a detector at a remote station is not stored in any type of memory but only the present condition of the detector is read out after a signal indicates that the condition of the detector has changed.

SUMMARY OF THE INVENTION

The present invention is concerned with an improvement in the Harrison et al. information retrieval scanning system. Specifically the signal apparatus has a relay means which is energized by one circuit when the detector apparatus changes from one condition to another and by a second circuit when the detector apparatus changes from the second condition to the first. The relay means has a holding circuit to hold the relay means in the energized position until a detector condition detection apparatus is energized to read out the present condition of the detector apparatus by the central station. The holding circuit is deenergized when the readout operation of the detector apparatus takes place, to place the remote station in a condition for responding to another change in the condition of the detector apparatus.

BRIEF DESCRIPTION OF THE DRAWING

The single figure is a schematic representation of an information retrieval scanning system having two representative remote stations connected to a scanning and control apparatus at a central station for providing a readout indication of only a change in the condition of the detector apparatus at either of the remote stations. The circuit diagram for the detector condition change signal apparatus at one of the stations is shown in detail.

DESCRIPTION

Referring to the single figure, a plurality of remote stations are connected to a central station or processor 10 containing scanning and control apparatus 11 and readout or detector condition indication or responsive apparatus 12. While two remote stations No. 1 and No. 2 are shown connected to central station 10, a plurality of such stations might be so connected and all the stations would contain apparatus similar to that shown in station No. 1.

Referring to station No. 1, a detector apparatus or switch 13 is controlled by a condition responsive apparatus 14. Detector apparatus or switch 13 is connected to an input circuit 15 of a detector condition change signal apparatus 20 which has an output circuit 21 connected to scanning and control apparatus 11 of the central station by a circuit 22 depending upon the change in condition or position, respectively of the detector apparatus or switch 13. Apparatus 20 has a source of power connected to terminal 23 and a ground terminal 24. A memory means or relay 25 has an energization winding 30 connected to be energized by one of two circuit means depending upon whether switch 13 opens or closes.

Upon switch 13 closing, relay 25 is initially energized by the source of power through a circuit including switch 13, input circuit 15, conductor 31, a capacitor 32 and resistor 33 parallel network, a resistor 34, a diode 35 and through winding 30 to ground. Upon energization of relay 25, a holding circuit is established when switch 40 is closed through resistor 41 connecting winding 30 directly between the source of power and ground. Simultaneously, switch 42 is closed to connect the source of power to the output circuit 21 to provide an output signal from the remote station No. 1 for the scanning and control apparatus of the central station.

A similar initial energization of relay 25 takes place upon switch 13 moving from a closed position to an open position. During the closed position of switch 13, current conducting device or transistor 43 has a voltage applied to control electrode 44 whereby a current flows between the output electrodes 45 and 50 through a circuit from the source of power through a resistor 51 to ground. Under this condition, a capacitor 52 is discharged through the circuit, including a resistor 53, and transistor 43. Upon switch 13 moving from a closed to an open position, transistor 43 is deenergized and capacitor 52 charges through the circuit including resistor 51 and winding 30 of relay 25 connected between the source of power and ground.

Under both conditions when switch 13 wither opens or closes, the current flow energizing relay 25 is short; however, the holding circuit for relay 25 maintains the relay energized and provides the output signal on circuit 21 to the central station.

Scanning and control apparatus 11 scans the plurality of remote stations and upon coming to a remote station which has an output signal such as the signal on output circuit 21 for remote station No. 1, the scanning and control apparatus 11 stops and energizes detector condition detection apparatus 60 through the circuit 61 connected to the scanning and control apparatus 11. While the circuit connection between each remote station and the central station is shown by a number of wires, one skilled in the art could use other transmission systems such as radio or leased telephone lines and not depart from my invention.

Apparatus 60 has a relay 62 which closes a pair of switches 63 and 64 to connect the opposite sides of switch 13 to the circuits 65 and 70 connected to readout apparatus 12. Specifically, switch 63 is connected to the upper side of switch 13 through resistor 51 and switch 64 is connected to the lower side of switch 13. Upon switches 63 and 64 closing, a voltage difference will exist between circuit 65 and 70 if switch 13 is open, and a voltage difference of opposite polarity will exist between circuit 65 and 70 if switch 13 is closed. Readout apparatus 12 provides an appropriate indication or control depending upon the status of the condition responsive apparatus at station No. 1, and after readout apparatus 12 has provided an appropriate indication or control, the scanning and control apparatus 11 deenergizes apparatus 60.

Upon the deenergization of detector condition detection apparatus 60, the detector condition change signal apparatus 20 is restored to a normal or standby condition by deenergizing the holding circuit or relay 25. Switch 71 opens and a capacitor 72 charges through the circuit including resistor 73 and a parallel network 74 connected between the source of power and ground to render the current conducting device or transistor 75 momentarily conductive. Transistor 75 shunts winding 30 of relay 25 to open switches 40 and 42 to restore the detector condition change signal apparatus 20 to its standby position and remove the output signal from the circuit 21.

OPERATION

When any one of the remote stations connected to the central station changes in condition to either move switch 13 from an open to a closed or a closed to an open position, relay 25 is energized and held in an energized position by the holding circuit. The energization of relay 25 when switch 13 closes is through the circuit including capacitor 32 and the energization of relay 25 when switch 13 opens is through the circuit including capacitor 52 when transistor 43 becomes nonconductive. When relay 25 is energized, an output signal is impressed upon circuit 21 by the closure of switch 42 to indicate to scanning and control apparatus 11 that a remote station has had a change in position of the switch 13. The central station scans the remote stations and upon arriving at station No. 1 which has the output signal, detector condition detection apparatus 60 is energized to readout the condition of the detector apparatus 13 and restore the detector condition signal apparatus 20 to its standby or normal condition by removing the output signal on circuit 21.

I claim:

1. A scanning system comprising:
   a plurality of remote stations each comprising:
      detector means operable between a first and a second condition;
      signal means connected to said detector means for providing an output signal upon said detector means moving from said first condition to said second condition sand upon said detector means moving from said second to said first condition; said signal means comprising, relay means and first and second circuit means connected to said relay means, said first circuit means energizing said relay means upon said detector means moving from said first to said second condition, said second circuit means energizing said relay means upon said detector means moving from said second to said first condition; and
      detector condition detection means connected to said detector means;
   a central station comprising:
      scanning means, and
      detector condition responsive means;
   means connecting said scanning means to said signal means of each of the remote stations whereby upon a change in the condition of a detector means at one of the remote stations, said output signal is available and said scanning means responds to said output signal;
   means controlled by said scanning means connecting each of said detector condition detection means to said detector condition responsive means whereby upon a scanning operation said detector condition detection means of the station having said output signal is connected to said detector condition responsive means to be responsive to the condition of said detector means of that remote station providing said output signal;
   said first circuit means comprises a transistor having a control electrode and a second capacitor means normally shunted by an output circuit of said transistor, said control electrode being connected to said detector means to close said output circuit when said detector means operates to a first condition, and circuit means including said second capacitor means for connecting said relay means to said source whereby upon said detector means moving to said second condition and said output circuit is opened and said relay means is energized upon said second capacitor means charging; and
   said second circuit means comprises capacitor means connected to a source of power to energize said relay means when said capacitor means charges upon said detector means moving to said first condition.
2. The system of claim 1 wherein:
   said relay means has a holding circuit energized when said relay means is energized by either said first circuit means or said second circuit means; and
   said holding circuit is deenergized by a circuit comprising second transistor means having a second output circuit connected to shunt said relay means when said transistor is energized, a control electrode, third capacitor means connected to said control electrode, and circuit means including said detection means for deenergizing said third capacitor means when said detector means condition is to be determined and thereby energizing said second transistor to close said second output circuit and deenergize said relay means.